J. A. HAGGERTY.
WHEEL MOUNTING FOR MOTORCYCLES.
APPLICATION FILED JUNE 7, 1920.

1,375,149.

Patented Apr. 19, 1921.
3 SHEETS—SHEET 1.

J. A. HAGGERTY.
WHEEL MOUNTING FOR MOTORCYCLES.
APPLICATION FILED JUNE 7, 1920.

1,375,149.

Patented Apr. 19, 1921.
3 SHEETS—SHEET 2.

WITNESSES:
Walter Chism
Augustus B. Copper

INVENTOR.
Joseph A. Haggerty.
BY
Joshua R. H. Potts
ATTORNEY.

J. A. HAGGERTY.
WHEEL MOUNTING FOR MOTORCYCLES.
APPLICATION FILED JUNE 7, 1920.
1,375,149.
Patented Apr. 19, 1921.
3 SHEETS—SHEET 3.
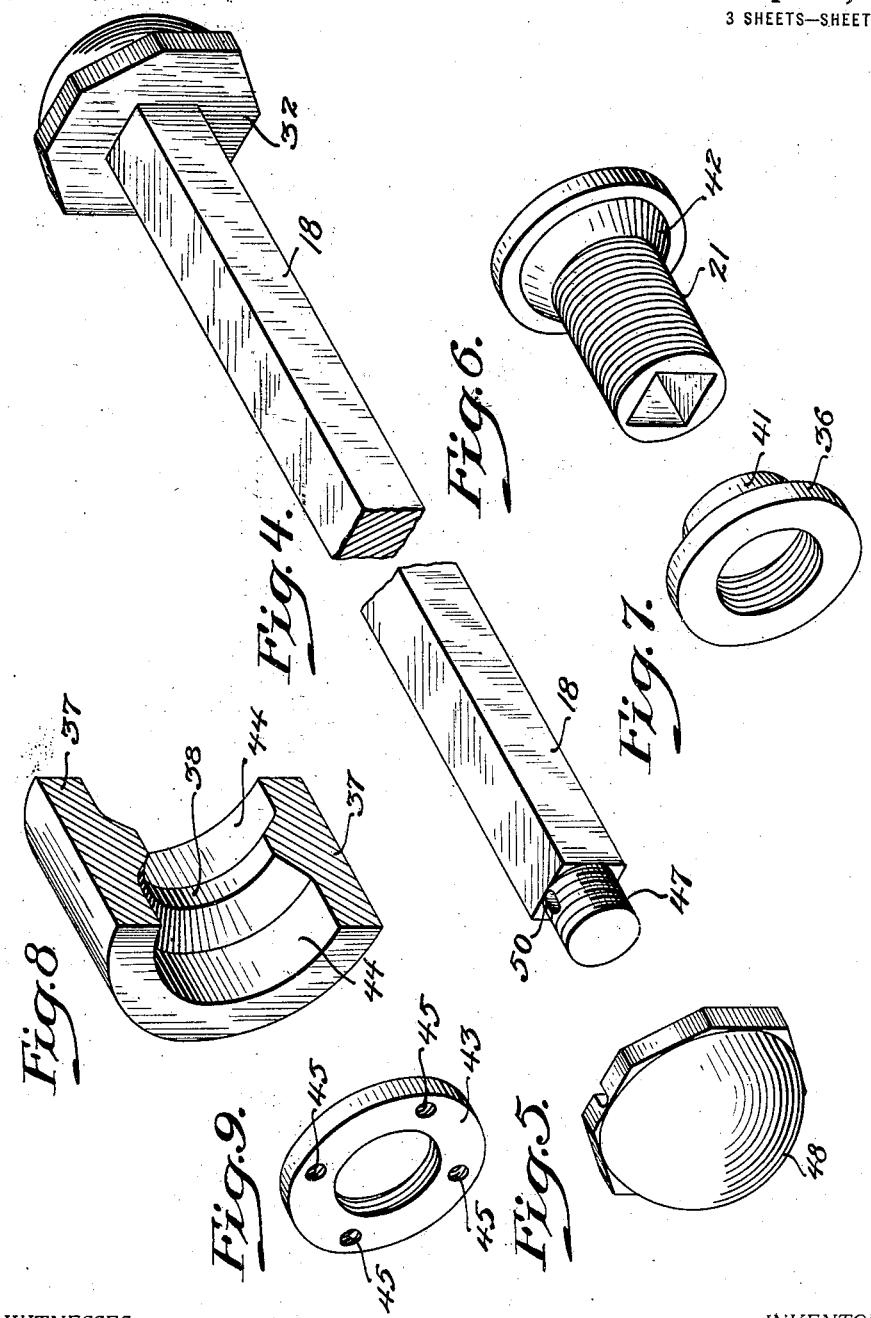
WITNESSES:
Walter Chism
Augustus B. Copper
INVENTOR.
Joseph A. Haggerty
BY
Joshua R. H. Potts
ATTORNEY.

UNITED STATES PATENT OFFICE.

JOSEPH A. HAGGERTY, OF PHILADELPHIA, PENNSYLVANIA.

WHEEL-MOUNTING FOR MOTORCYCLES.

1,375,149. Specification of Letters Patent. Patented Apr. 19, 1921.

Application filed June 7, 1920. Serial No. 386,933.

*To all whom it may concern:*

Be it known that I, JOSEPH A. HAGGERTY, a citizen of the United States, residing at Philadelphia, in the county of Philadelphia and State of Pennsylvania, have invented certain new and useful Improvements in Wheel-Mountings for Motorcycles, of which the following is a specification.

The difficulty of removal and replacement of the driving wheels of motorcycles is well known. This difficulty of removal and replacement of the driving wheels is due principally to the inclusion of the necessary brake construction and surrounding parts of the frame and wheel mounting which have heretofore been complicated, requiring the removal of numerous parts before the driving wheel could be removed or the parts of the wheel-bearing adjusted.

One object of my present invention is to provide a construction which will permit the driving wheel of a motor cycle to be easily and quickly removed and replaced.

Another object is to so make my improved construction that it will permit the parts of the bearing to be easily and quickly adjusted.

A still further object is to make the parts of my invention of a simple, strong and durable construction which can be practically embodied in a motorcycle.

These objects, and other advantageous ends which will be described hereinafter, I attain in the following manner, reference being had to the accompanying drawings in which—

Figure 1:
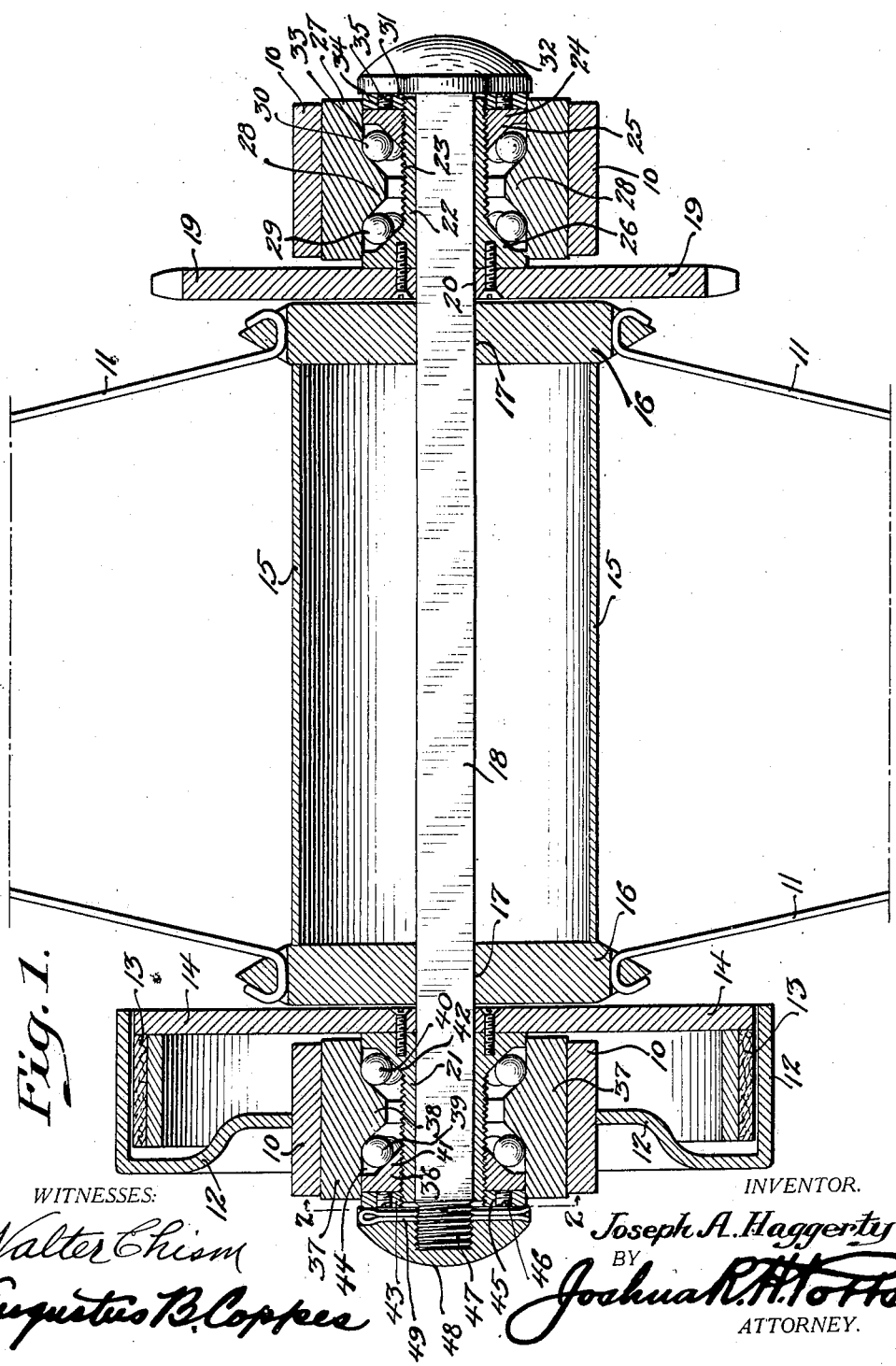
Figure 2:
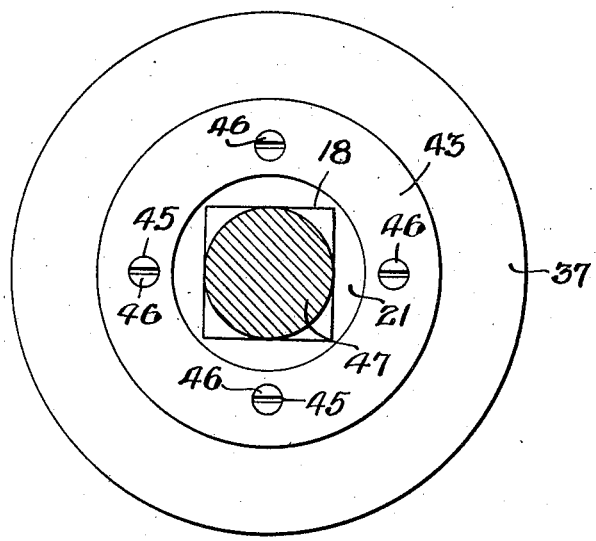
Figure 3:
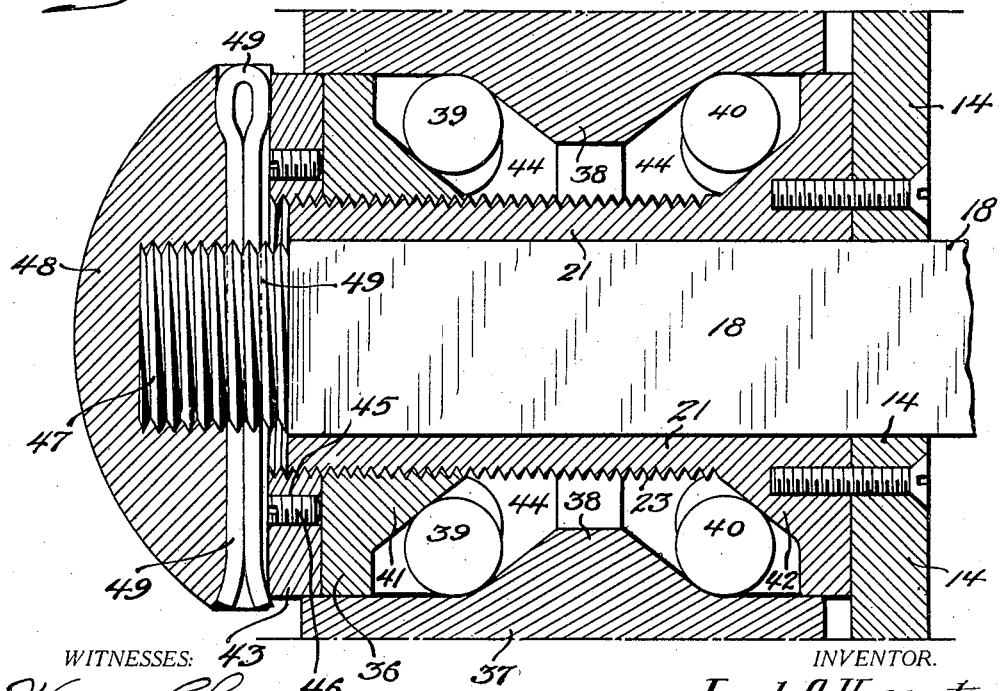

Figure 1 is a sectional elevation taken centrally through the rear driving wheel of the motorcycle and the surrounding parts of the brake band, frame, and bearing, Fig. 2 is a transverse section taken on the line 2—2 of Fig. 1, Fig. 3 is a view showing certain of the parts illustrated in Fig. 1 and drawn on an enlarged scale, Figs. 4, 5, 6, 7, 8 and 9 are perspective views illustrating certain of the features of my invention; Fig. 8 being shown in central longitudinal section.

Referring to the drawings, 10 represents parts of the frame of a motorcycle which are located on opposite sides of the driving wheel 11; the part 10 on one side of the driving wheel being provided with one element, such as shown at 12, of a brake made in the form of a brake drum in which fits the brake band 13; said brake band also being in engagement with a disk 14. Thus said parts 12, 13 and 14 may be constructed in the usual manner of making the parts of a brake and as illustrated is of a well known type. The hub 15 of the driving wheel 11 includes two end pieces 16 which have square holes 17 formed centrally therein through which extends a square axle 18. In other words, the holes 17 are made angular in cross section and the axle is made angular in cross section so as to be free to be slid longitudinally therein and rotate in conjunction with the driving wheel. The disk 14 also has an angular hole through which the axle 18 freely extends and an actuating wheel, illustrated in the form of a driving sprocket 19 adjacent the opposite side of the hub has an angular hole 20 through which said axle 18 extends.

Bearing sleeves 21 and 22 which are preferably similarly constructed are secured respectively to the disk 14 and sprocket 19; said sleeves having central holes which are angular in cross section and through which the angular axle 18 freely extends. The sleeve 22 has an externally screw threaded portion 23 upon which is screwed a collar 24; said collar having an inwardly projecting tapered or frusto-conical portion 25. The sleeve 22 has a frusto-conical portion 26 opposed to the portion 25 of the collar and a ring 27 which fits within the right hand frame portion 10 has an inwardly tapering circular rib 28. A series of ball bearings 29 are interposed between the frusto-conical portion 26 and one side of the rib 28 and a second series of ball bearings 30 is interposed between the frusto-conical portion 25 of the collar 24 and the adjacent side of the rib 28 as clearly shown in Fig. 1.

An adjusting ring 31 is interposed between the collar 24 and the head 32 of the axle 18; this adjusting ring being preferably screwed onto the portion 23 of the sleeve 22. The adjusting ring 31 is preferably of such diameter as to fit within the cavity 33 of the ring 27 in which the collar 24 is located and is provided with a number of screw threaded holes 34 in which small screws 35 fit. The inner ends of the screws 35 are adapted to abut the outer face of the collar 24 and the head 32 of the axle 18 is of such diameter as to cover the screw threaded holes 34. The outer face of the adjusting ring 31 projects beyond the outer face of the ring 27 so that the axle head 32 contacts with the adjusting ring 31 and is free of the ring 27.

At the opposite side of the driving wheel a collar 36 similar to the collar 24 is screwed on the sleeve 21 and a ring 37 is fitted within the frame portion 10 and provides a closure for the sleeve 21 and collar 36. This ring 37 has a circular inwardly tapering rib 38 and two series of ball bearings 39 and 40 are interposed between the frusto-conical portions 41 and 42 of the collar 36, sleeve 21 and rib 38. An adjusting ring 43 is preferably screwed on the outer end of the sleeve 21 and fits within the cavity 44 of the ring 37 so that a portion of the adjusting ring 43 projects beyond the outer surface of the ring 37. The adjusting ring 43 is constructed similarly to the adjusting ring 31 above noted and includes a number of screw threaded holes 45 in which are threaded screws 46 adapted to abut the outer surface of the collar 36. The end of the axle 18 opposite the head 32 is screw threaded as shown at 47 and a cap nut 48 is screwed on the end 47 and abuts the outer surface of the adjusting ring 43. A cotter pin 49 extends through the cap nut 48 and a hole 50 in the end 47 of the axle 18.

With the above construction, if it is desired to remove the driving wheel 11, it is merely necessary to withdraw the cotter pin 49 and take off the cap nut 48. The entire axle 18 can be withdrawn by pulling outwardly on the head 32 and the driving wheel 11 will be freed and can be removed; the sprocket wheel, brake and bearings remaining connected to the frame. If it is desired to take up or compensate for wear in the bearings, it is merely necessary to turn the collars 24 and 36 and then in order to keep the nut 48 and head 32 of the axle 18 properly spaced the screws 35 and 46 can be turned inwardly so as to keep in abutment with their respective collars so that even after the adjustment of the bearings is made the outer surfaces of the adjusting rings 31 and 43 will remain the same distance apart as before the adjustment was made.

The parts can be readily disassembled and put together and no complicated mechanism is present. Furthermore with my improved construction it is not necessary, when it is desired to remove and replace the wheel, to disturb the adjustment of the bearings unless as previously stated it is desired to adjust the bearings to compensate for wear.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination in a motorcycle of two frame portions spaced apart; bearings in said frame portions; an actuating wheel secured to one of said bearings; a driving wheel positioned between said frame portions and including a hub having a hole angular in cross section; and an axle having an angular portion slidably fitting within said hole in the driving wheel and having a part locked to rotate with said one bearing but being freely slidable lengthwise therethrough, said axle having a nut screwed thereon which is removable to permit said axle to be withdrawn from the hub of the driving wheel; substantially as described.

2. The combination in a motorcycle of two frame portions spaced apart; bearings in said frame portions; an actuating wheel secured to one of said bearings; a driving wheel positioned between said frame portions and including a hub having a hole angular in cross section; and an axle having an angular portion slidably fitting within said hole in the driving wheel, one of said portions having a nut screwed thereon which is removable to permit said axle to be withdrawn from the hub of the driving wheel, said bearings including parts having holes angular in cross section in which angular portions of said axle freely fit whereby said bearings will rotate in conjunction with said axle; substantially as described.

3. The combination in a motorcycle of two frame portions spaced apart; bearings in said frame portions; an actuating wheel secured to one of said bearings; a driving wheel positioned between said frame portions and including a hub having a hole angular in cross section; an axle having an angular portion slidably fitting longitudinally within said hole in the driving wheel, said axle having a head located outside of one of said bearings; and a nut on said axle located on the outside of the other of said bearings; substantially as described.

4. The combination in a motorcycle of two frame portions spaced apart; bearings in said frame portions; an actuating wheel secured to one of said bearings; a driving wheel positioned between said frame portions and including a hub having a hole angular in cross section; an axle having an angular portion slidably fitting within said hole in the driving wheel and having portions rotatable in conjunction with said bearings but freely slidable therethrough, one of said portions having a nut screwed thereon which is removable to permit said axle to be withdrawn from the hub of the driving wheel; and a brake having a portion secured to one of said bearings; substantially as described.

5. The combination in a motorcycle of two frame portions spaced apart; bearings in said frame portions; an actuating wheel secured to one of said bearings; a driving wheel positioned between said frame portions and including a hub having a hole angular in cross section; an axle having an angular portion slidably fitting longitudinally within said hole in the driving wheel, said axle having a head located outside of one of said bearings; a nut on said axle located on the outside of the other of said bearings, said bearings including screw threaded sleeves; collars on said sleeves; adjusting rings interposed between said collars and said head and nut respectively and forming abutting means for said head and nut; and screws fitting within said adjusting rings and adapted to abut said collars; substantially as described.

6. The combination in a motorcycle of two frame portions spaced apart; bearings in said frame portions; an actuating wheel secured to one of said bearings; a driving wheel positioned between said frame portions and including a hub having a hole angular in cross section; an axle having an angular portion slidably fitting longitudinally within said hole in the driving wheel, said axle having a head located outside of one of said bearings; a nut on said axle located on the outside of the other of said bearings, said bearings including screw threaded sleeves; collars on said sleeves; adjusting rings interposed between said collars and said head and nut respectively and forming abutting means for said head and nut; screws fitting within said adjusting rings and adapted to abut said collars; means supported by said frame portions and providing spaces into which said sleeves and collars extend, said means including an inwardly tapering circular rib, said sleeves and collars having opposed tapering surfaces; and ball bearings located between said latter surfaces and the respective side surfaces of said ribs; substantially as described.

In testimony whereof I have signed my name to this specification in the presence of two subscribing witnesses.

JOSEPH A. HAGGERTY.

Witnesses:
WILLIAM J. HAGERTY,
CHAS. E. POTTS.